United States Patent
Memon et al.

(10) Patent No.: US 11,615,372 B2
(45) Date of Patent: Mar. 28, 2023

(54) DISTRIBUTED WAREHOUSING

(71) Applicant: GOOGLE LLC, Mountain View, CA (US)

(72) Inventors: Amir Hussain Memon, Fremont, CA (US); Ali Asghar Beyad, Mountain View, CA (US); Sajid Mahmood Siddiqi, Newark, CA (US)

(73) Assignee: GOOGLE LLC, Mountain View, CA (US)

( * ) Notice: Subject to any disclaimer, the term of this patent is extended or adjusted under 35 U.S.C. 154(b) by 103 days.

(21) Appl. No.: 15/990,808

(22) Filed: May 28, 2018

(65) Prior Publication Data

US 2019/0362308 A1    Nov. 28, 2019

(51) Int. Cl.
*G06Q 10/08* (2012.01)
*G06Q 10/0837* (2023.01)
*G06Q 10/083* (2023.01)

(52) U.S. Cl.
CPC ..... *G06Q 10/0837* (2013.01); *G06Q 10/0838* (2013.01)

(58) Field of Classification Search
CPC .............. G06Q 10/0837; G06Q 10/0838
See application file for complete search history.

(56) References Cited

U.S. PATENT DOCUMENTS

| | | | | |
|---|---|---|---|---|
| 10,198,749 B1* | 2/2019 | Haskin | | G06Q 10/0837 |
| 2002/0019785 A1* | 2/2002 | Whitman | | G06Q 10/087 |
| | | | | 705/28 |
| 2003/0225625 A1* | 12/2003 | Chew | | G06Q 30/06 |
| | | | | 705/24 |
| 2004/0088225 A1* | 5/2004 | Foth | | G06Q 30/06 |
| | | | | 705/26.41 |
| 2004/0186794 A1* | 9/2004 | Renz | | G06Q 10/06 |
| | | | | 705/28 |
| 2008/0040208 A1* | 2/2008 | Foth | | G06Q 30/06 |
| | | | | 705/12 |
| 2009/0216371 A1* | 8/2009 | Amato | | G06Q 10/087 |
| | | | | 705/28 |
| 2012/0323645 A1* | 12/2012 | Spiegel | | G06Q 10/083 |
| | | | | 705/14.1 |
| 2017/0364860 A1* | 12/2017 | Wilkinson | | G06Q 30/0255 |

OTHER PUBLICATIONS

Alphabet Signs, "Return Policy," 2016, https://www.alphabetsigns.com, retrieved from https://web.archive.org/web/20161231025351/https://www.alphabetsigns.com/return-policy.html (Year: 2016).*

* cited by examiner

*Primary Examiner* — Shannon S Campbell
*Assistant Examiner* — Bryan J Kirk
(74) *Attorney, Agent, or Firm* — Dority & Manning, P.A.

(57) ABSTRACT

Distributing warehousing of products by receiving, by a distributed warehousing system, a first notification that a product was delivered to a first customer at a first location. The technology receives a designation of the delivered product for return, and then identifies a second delivery location for the designated product, the second delivery location being a location of a second customer. A second notification of pickup of the designated product from the first location is then received by the technology. The technology then directs delivery of the product to the second location, without an intermediate storage of the product at a brick-and-mortar distribution facility, in response to receiving the second notification, and receives a third notification that the product was delivered to the second location.

18 Claims, 5 Drawing Sheets

200

```
┌─────────────────────────────────────────────────────────────────────────┐
│  Receive a first notification that a product was delivered to a first   │
│                           customer at a first location                   │
│                                    210                                   │
└─────────────────────────────────────────────────────────────────────────┘
                                     │
                                     ▼
┌─────────────────────────────────────────────────────────────────────────┐
│            Receive a designation of the delivered product for return    │
│                                    220                                   │
└─────────────────────────────────────────────────────────────────────────┘
                    │                                    │
                    ▼                                    ▼
┌──────────────────────────────┐      ┌──────────────────────────────────┐
│ Identifying a second delivery│      │  Receive a second notification of│
│ location for the designated  │      │  pickup of the designated product│
│ product, the second delivery │      │         from the first location  │
│ location being a location of │      │                240               │
│      a second customer       │      │                                  │
│             230              │      │                                  │
└──────────────────────────────┘      └──────────────────────────────────┘
                    │                                    │
                    └──────────────────┬─────────────────┘
                                       ▼
┌─────────────────────────────────────────────────────────────────────────┐
│ Direct delivery of the product to the second location, without an       │
│ intermediate storage of the product at a brick-and-mortar distribution  │
│ facility, in response to receiving the second notification              │
│                                    250                                   │
└─────────────────────────────────────────────────────────────────────────┘
                                     │
                                     ▼
┌─────────────────────────────────────────────────────────────────────────┐
│  Receive a third notification that the product was delivered to the     │
│                              second location                             │
│                                    250                                   │
└─────────────────────────────────────────────────────────────────────────┘
```

FIG. 2

DISTRIBUTED WAREHOUSING

TECHNICAL FIELD

The technology disclosed herein is related to distributed warehousing. Particular examples relate to computer implemented methods of product redistribution.

BACKGROUND

Typically, when a customer wants to return a package ordered online and delivered to their home, the customer repacks the item in the original packaging, prints a return label and affixes the label to the repackaged item, and presents the repackaged item for return shipment. The returned package is transported to the address on the return label, typically a distribution center outside the immediate delivery area of the customer, where it becomes available to distribute to a subsequent customer anywhere.

SUMMARY

The technology described herein includes computer implemented methods, computer program products, and systems to distribute warehousing of products. In some examples, one or more computing devices a distributed warehousing system receive a first notification that a product was delivered to a first customer at a first location, and later receive a designation of the delivered product for return. The distributed warehousing system identifies a second delivery location for the designated product, the second delivery location being a location of a second customer. The distributed warehousing system also receives a second notification of pickup of the designated product from the first location. The technology then directs delivery of the product to the second location, without an intermediate storage of the product at a brick-and-mortar distribution facility, in response to receiving the second notification. The distributed warehousing system then receives a third notification that the product was delivered to the second location.

In some embodiments, identifying the second delivery location of the second customer for the designated product includes identifying the second delivery location within a delivery area of the first customer, and identifying the second customer as having a pending order for the product.

In some embodiments, identifying a second delivery location of a second customer for the designated product includes determining that the product is eligible for delivery to the second customer and that the first customer is eligible to be the source of the product. In some such embodiments, determining that the first customer is eligible to be the source of the product is based on one or more of ratings of the first customer as the source of prior products and difficulty of repackaging the product.

In some embodiments, identifying a second delivery location of a second customer for the designated product includes predicting a likelihood, over a threshold, that the product will be ordered by a second customer within a delivery area of the first customer within a predetermined period from the designation of the delivered product for return. The second customer is then identified as placing an order for the product within the predetermined time period and the second delivery location within a delivery area of the first customer. In some such embodiments, the likelihood includes both a probability of the product being ordered in the delivery area the first customer within the predetermined period, and a confidence interval for the probability. In some such embodiments, identifying a second delivery location of a second customer for the designated product further includes directing intermediate storage of the product, at one of the first location or within a vehicle of the party from which the pickup notification was received, until an order for the product is placed by a the second customer.

These and other aspects, objects, features, and advantages of the technology described herein will become apparent to those having ordinary skill in the art upon consideration of the following detailed description of illustrated examples.

BRIEF DESCRIPTION OF THE DRAWINGS

FIG. 2 is a block diagram illustrating methods to distribute warehousing of products, in accordance with certain examples.

DETAILED DESCRIPTION OF THE EXAMPLES

The typical process for returning items delivered to a customer involves costs for shipping the item to a distribution center, often the same center that sourced the item. For some items, especially items that are in high demand, distributing the warehousing of returned products until new customers order the product offers increased efficiencies in the use of computing resources, delivery resources, and warehouse capacity.

By using and relying on the methods and systems described herein, the technology disclosed herein can provide reduce the throughput required by warehouse computing resources As such, the technology may be employed to improve warehouse distribution computer systems operation.

Turning now to the drawings, in which like numerals represent like (but not necessarily identical) elements throughout the figures, examples of the present technology are described in detail.

Example System Architectures

Figure 1:
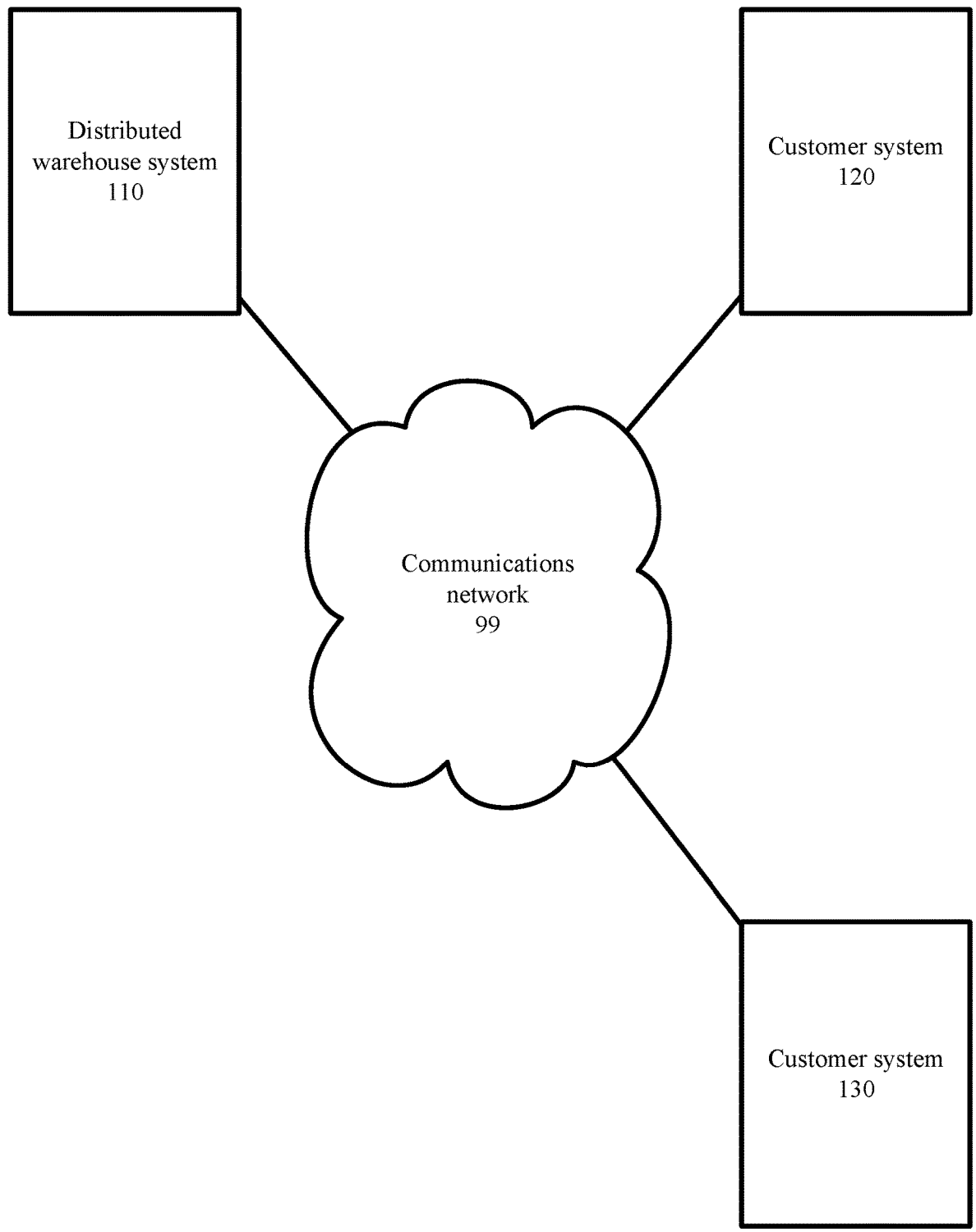
FIG. 1 is a block diagram depicting an operating environment to distribute warehousing of products, in accordance with certain examples.

FIG. 1 is a block diagram depicting an example operating environment 100 in accordance with certain examples of the technology disclosed herein. While each server, system, and device shown in the operating environment is represented by one instance of the server, system, or device, multiple instances of each can be used. Further, while certain aspects of operation of the present technology are presented in examples related to FIG. 1 to facilitate enablement of the claimed invention, additional features of the present technology, also facilitating enablement of the claimed invention, are disclosed elsewhere herein.

As depicted in FIG. 1, the example operating environment 100 includes computing devices 110, 120, and 130. Each of devices 110, 120, and 130, may be configured to communicate with one another via communications network 99. In some examples, a user associated with a device must install an application and/or make a feature selection to obtain the benefits of the technology described herein.

Network 99 includes one or more wired or wireless telecommunications means by which network devices may exchange data. For example, the network 99 may include one or more of a local area network (LAN), a wide area network (WAN), an intranet, an Internet, a storage area network (SAN), a personal area network (PAN), a metropolitan area network (MAN), a wireless local area network (WLAN), a virtual private network (VPN), a cellular or other mobile communication network, a BLUETOOTH® wireless technology connection, a near field communication (NFC) connection, any combination thereof, and any other appropriate architecture or system, that facilitates the RF communication of signals, data, and/or messages. Throughout the discussion of examples, it should be understood that the terms "data" and "information" are used interchangeably herein to refer to text, images, audio, video, or any other form of information that can exist in a computer-based environment.

Each computing device 110, 120, and 130 can include a communication module capable of transmitting and receiving data over the network 99. For example, each network device can include a server, a desktop computer, a laptop computer, a tablet computer, a television with one or more processors embedded therein and/or coupled thereto, a smart phone, a handheld computer, a personal digital assistant (PDA), or any other wired or wireless processor-driven device.

In examples described herein, computing device 110 is a set of distributes computing resources operative to practice examples of the technology disclosed herein. In some examples, the computing system 120 and computer system 130 are consumer computing systems such as a smart phone, a laptop computer, or a desktop computer.

The connections illustrated are examples, and other means of establishing a communications link between the computers and devices can be used. Moreover, those having ordinary skill in the art having the benefit of the present disclosure will appreciate that the computing devices illustrated in FIG. 1 may have any of several other suitable computer system configurations. For example, computing device 110 may be embodied as a system and may not include all the components described above.

Figure 5:
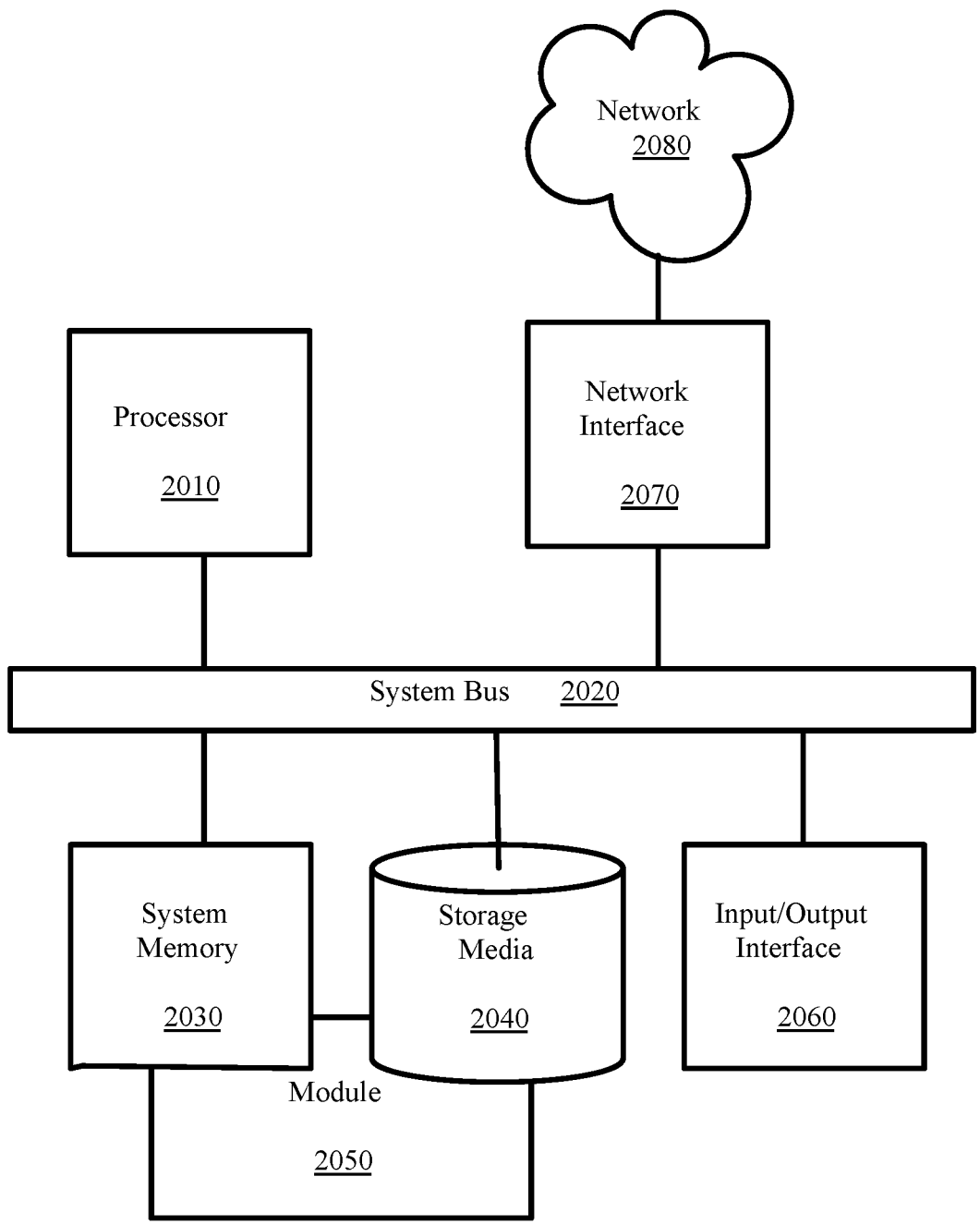
FIG. 5 is a block diagram depicting a computing machine and a module, in accordance with certain examples.

In examples, the computing devices, and any other computing machines associated with the technology presented herein, may be any type of computing machine such as, but not limited to, those discussed in more detail with respect to FIG. 5. Furthermore, any modules associated with any of these computing machines, such as modules described herein or any other modules (scripts, web content, software, firmware, or hardware) associated with the technology presented herein may be any of the modules discussed in more detail with respect to FIG. 5. The computing machines discussed herein may communicate with one another as well as other computer machines or communication systems over one or more networks, such as network 99. The network 99 may include any type of data or communications network, including any of the network technology discussed with respect to FIG. 5.

Example Processes

The example methods illustrated in the figures are described hereinafter with respect to the components of the example operating environment 100. The example methods also can be performed with other systems and in other environments. The operations described with respect to any of the figures can be implemented as executable code stored on a computer or machine readable non-transitory tangible storage medium (e.g., floppy disk, hard disk, ROM, EEPROM, nonvolatile RAM, CD-ROM, etc.) that are completed based on execution of the code by a processor circuit implemented using one or more integrated circuits; the operations described herein also can be implemented as executable logic that is encoded in one or more non-transitory tangible media for execution (e.g., programmable logic arrays or devices, field programmable gate arrays, programmable array logic, application specific integrated circuits, etc.).

Referring to FIG. 2, and continuing to refer to FIG. 1 for context, methods 200 to distribute warehousing of products are illustrated in accordance with certain examples. In such methods 200, one or more computing devices of a distributed warehousing system 110 receives a first notification that a product was delivered to a first customer at a first location—Block 210. As a continuing example, consider Alice, the original buyer of a toaster oven from StoreMart. The toaster oven is in high demand, but is also subject to a high return rate as many customers are unsure of how well the toaster oven will work for them—so the purchase is often exploratory in nature. The distributed warehouse system 110 receives a notification that the toaster oven was delivered to Alice's home in her local delivery area. The notification was sent to the distributed warehouse system 110 within minutes of the delivery of the package by Diana the delivery person. In other embodiments, the notification can come from Alice's computer system 120, via StoreMart's web site, upon retrieving the package containing the toaster oven.

The distributed warehouse system 110 receives a designation of the delivered product for return—Block 220. In the continuing example, Alice finds out that her husband Hal also purchased the same toaster oven. Alice logs on to her StoreMart online account using her computer system 120, and is presented with a web page that allows her to designate the toaster oven for return. Alice's designation of the toaster oven for return is received by the distributed warehouse system 110.

In some embodiments, the distributed warehouse system 110 instructs Alice, via her computing system 120, on the procedure for returning the toaster oven. In some embodiments, such instructions include instructions to print a return label, repackage the toaster oven in its original packaging, and affix the printed return label to the package. Note that in such embodiment, it is not necessary to know that a second customer exists. For example, the return label can merely designate the original shipping location of the toaster oven, or any other return location used by StoreMart. In such embodiments, Alice leaves the package, relabeled for return, in a place for a delivery service, for example Diana, to pick up. In some embodiments, the distributed warehouse system 110 instructs Alice to merely repackage the toaster oven and place it outside for pickup without a change in the label. For example, the distributed warehouse system 110 can change the meaning of a bar code (or QR code or similar code) incorporated in the original label to indicate a returned product. In some embodiments, the distributed warehouse system 110 instructs Alice to remove the label containing her identifying information and any internal papers containing similar information from the package.

The distributed warehouse system 110 identifies a second delivery location for the designated product, the second delivery location being a location of a second customer—Block 230. In the continuing example, a second customer (Bob) has placed an order for the same model toaster over with StoreMart via his computer 130. Bob's delivery location is near Alice's delivery location and in the delivery zone served by Diana—though in some embodiments the second order can be from outside Alice's delivery zone and served by another delivery person or another delivery service. The distributed warehouse system 110 identifies Bob's delivery location as a new delivery location for the toaster oven designated for return by Alice.

The distributed warehouse system 110 receives a second notification of pickup of the designated product at the first location—Block 240. In the continuing example, the distributed warehouse system 110 receives a notification that Diana has picked up the package with the return label from Alice's front stoop. In other examples, a delivery person other than Diana, working for the same delivery service or another delivery service, picks up the package. In yet other embodiments, Alice deposits the repackaged toaster oven with its new label at a locker used by a delivery service or by StoreMart, and the second notification is received by the distributed warehouse system 110 from the locker.

The distributed warehouse system 110 directs delivery of the product to the second location, without an intermediate storage of the product at a brick-and-mortar distribution facility, in response to receiving the second notification—Block 250. In the continuing example, the distributed warehouse system 110, upon Diana scanning the label that Alice has attached to the repackaged toaster oven, directs Diana to deliver the repackaged toaster oven to Bob's delivery location.

In some embodiments, this direction includes Diana printing out a new label with Bob's address and attaching the new label to the repackaged toaster oven. The new label is the first time that the package includes human-readable information associating the package with Bob. Note that in some embodiment, the distributed warehouse system 110 directed Alice to remove human-readable information associating the package with Alice as par of repackaging.

The distributed warehouse system 110 receives a third notification that the product was delivered to the second location—Block 260. In the continuing example, Diana delivers the repackaged and relabeled toaster oven to Bob.

Figure 3:
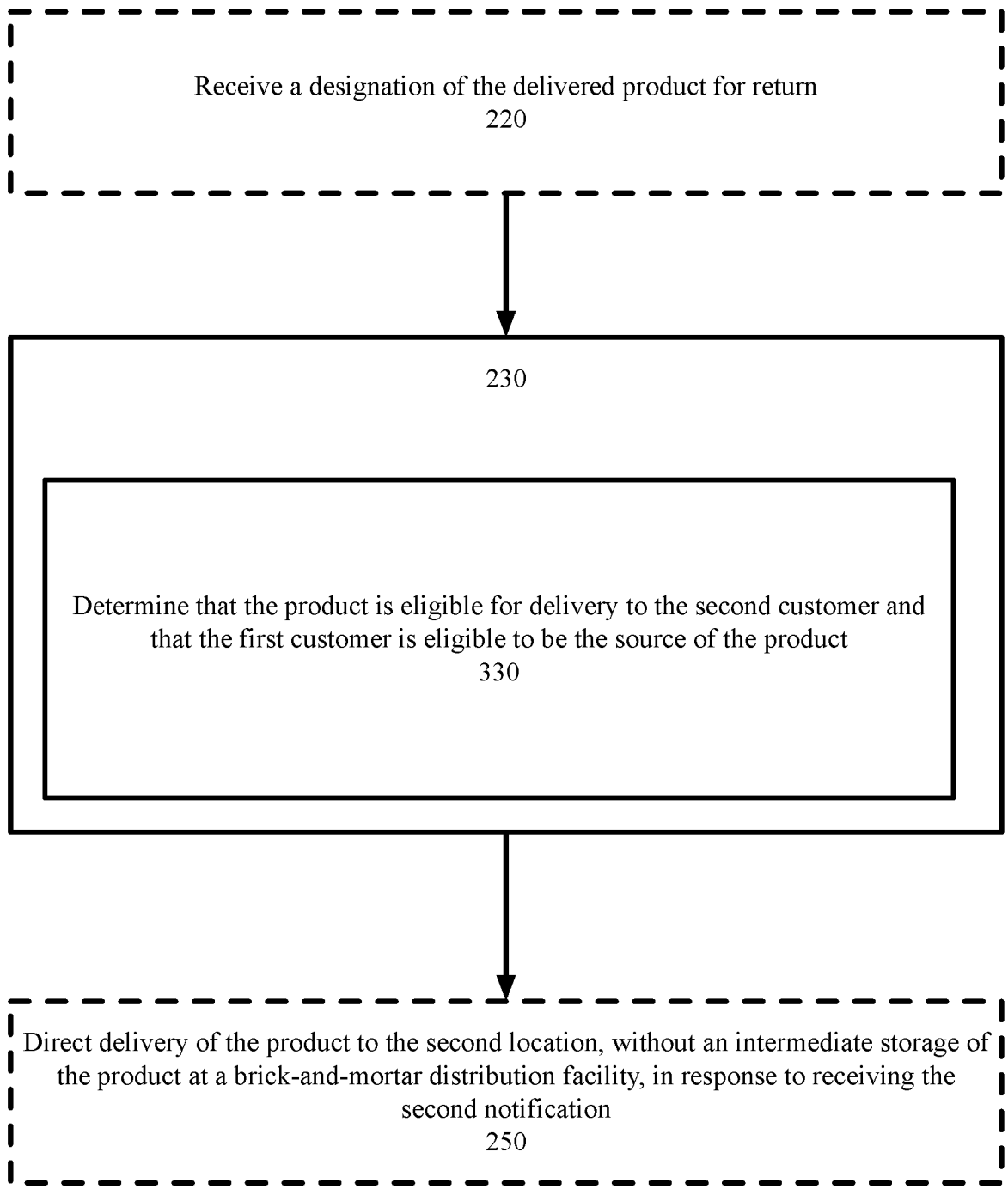
FIG. 3 is a block diagram illustrating methods to distribute warehousing of products, in accordance with certain examples.

Referring to FIG. 3, and continuing to refer to prior figures for context, methods 300 to distribute warehousing of products are illustrated, in accordance with certain examples. In such methods 300, Block 210, 220, 240, and 250 are performed as described above. In such methods 300 identifying a second delivery location of a second customer for the designated product includes determining that the product is eligible for delivery to the second customer and that the first customer is eligible to be the source of the product—Block 330.

In the continuing example, the distributed warehouse system 110 determines that the toaster oven is eligible for delivery to the Bob and that Alice is eligible to be the source of the product. The distributed warehouse system 110 determines that the toaster oven is a product eligible for distributed warehousing in part because a) it is relatively straightforward to determine if a toaster oven has been used, and b) it is relatively straightforward for a customer to repackage a toaster oven. In some embodiments, the eligibility decisions are derived from one or both of historical data collected from prior returns and heuristic assessments. The distributed warehouse system 110 maintains a rating system for customers based on feedback from recipients of the customer's returns. In the continuing example, the distributed warehouse system 110 determines that 100% of Alice's returns that enter the distributed warehouse process are accepted by customers without complaint.

Various embodiments of the system 110 weigh product eligibility and first customer rating differently. Any given embodiment can modify the weighting over time and in consideration of other factors, for example existing demand and predicted demand for the product as described elsewhere herein. In a variation of the continuing example, if Bob found the package as-delivered unacceptable, StoreMart would allow him to make a conventional return, and deliver a new toaster oven from a conventional warehouse.

Figure 4:
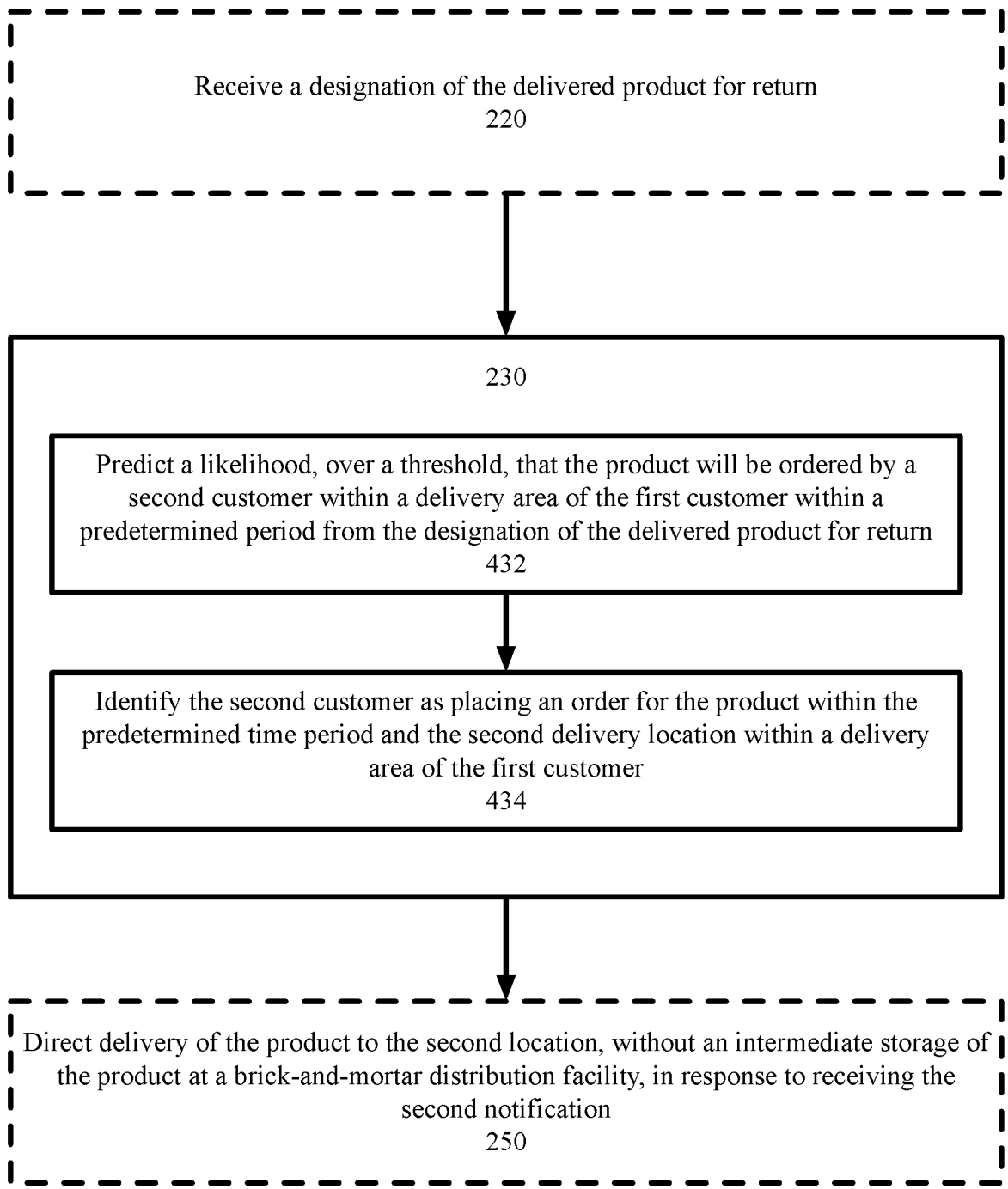
FIG. 4 is a block diagram illustrating methods to distribute warehousing of products, in accordance with certain examples.

Referring to FIG. 4, and continuing to refer to prior figures for context, methods 400 to distribute warehousing of products are illustrated, in accordance with certain examples. In such methods 400, Block 210, 220, 240, and 250 are performed as described above. In such methods 400 identifying a second delivery location of a second customer for the designated product includes predicting a likelihood, over a threshold, that the product will be ordered by a second customer within a delivery area of the first customer within a predetermined period from the designation of the delivered product for return—Block 432.

In a variation of the continuing example, Alice submits, via her computer 120 a request on StoreMart's website (received by the distributed warehouse system 110) to return the toaster oven. But in this case, the distributed warehouse system 110 does not find a pending order for the toaster oven. Not finding a pending order, the distributed warehouse system 110 queries a demand prediction model for the toaster oven within the delivery area (in this case Diana's delivery area) that includes Alice's delivery location. The demand prediction model outputs both: a probability of an order within a given time period, and a confidence interval for the probability.

In the variation of the continuing example, the demand prediction model is a queryable, updatable, service. It provides access to a machine learning model that uses purchase and return data to predict region-specific demand for individual products. In some embodiments, the model uses supervised machine learning that takes into account a variety of data during training, including the purchasing habits of past customers within the region. At query time, the model takes as input a product identifier, region characteristics (such as mille ID, population density, demographics, and weather), and time frame. The output of querying the model is a predicted probability, and confidence interval for the probability, of the queried product being purchased in the given region within the specified time frame.

In some embodiments, the model is implemented as a deep neural network. In some such embodiments, the loss function at the model output is a sigmoid (logistic loss) function to predict a probability between zero and one. In some such embodiments, model characteristics such as hidden layer widths, number of layers, regularization parameters, initial values, and gradient optimizers can be automatically selected.

Training data for any given product in any given region may be sparse, especially for thinly-populated regions or low-sales-volume products. To address these issues, some embodiments of the model generalize across products and/or regions having similar characteristics. For example, a pair of jeans can be characterized by parameters such as color, style, zipper vs. button, torn vs. untorn, etc., and across regions with similar characteristics (for example urban, rural, etc.). In some embodiments, semantic characteristics of products and regions are based on historical information.

In a training example, given a prediction window of N days, the training data includes <product, region> tuples as input and a <sold-in-next-N-days?> Boolean label as output, for all products and regions, for as given period. In some embodiments, the individual-level purchase histories, buying patterns and known characteristics of users in a given locale could be taken into account for features. At training time, the technology can generate this data for signed-in users as well. In some embodiments, the initial version of this model is trained using sequential training on the data from past to present. After that, the model is updated periodically in batches of data, for example, on a hourly/daily/weekly basis. The smaller the training window and the more frequently the model is updated, the more 'fresh' the predictions will be.

In some embodiments, system can predict demand surges (e.g. fidget spinners, or new smartphones). Such embodiments use a class of time-series algorithms for change point detection that monitor time series continuously and classify whether the underlying distribution of the time series has changed qualitatively. For example, for time series data denoting region-specific sales, a surge in sales is one such a qualitative change. If the algorithm detects a change for a given product, the technology flags the product to be 'kept around' after returns for a bit longer than usual, since the model predicts that it will likely be re-ordered soon.

Different embodiments of the technology employ any one of several types of change-point detection methods. Model-based methods involve training statistical models of time series (such as AutoRegressive Moving Average (ARMA) models, state space models, and Kalman filters). Model-free methods use thresholds and incremental statistics of the data to predict when a qualitative change has occurred. In each, the data undergoes preprocessing to eliminate non-stationarity due to seasonality and heteroscedasticity.

Other Examples

FIG. 5 depicts a computing machine 2000 and a module 2050 in accordance with certain examples. The computing machine 2000 may correspond to any of the various computers, servers, mobile devices, embedded systems, or computing systems presented herein. The module 2050 may comprise one or more hardware or software elements configured to facilitate the computing machine 2000 in performing the various methods and processing functions presented herein. The computing machine 2000 may include various internal or attached components such as a processor 2010, system bus 2020, system memory 2030, storage media 2040, input/output interface 2060, and a network interface 2070 for communicating with a network 2080.

The computing machine 2000 may be implemented as a conventional computer system, an embedded controller, a laptop, a server, a mobile device, a smartphone, a set-top box, a kiosk, a router or other network node, a vehicular information system, one or more processors associated with a television, a customized machine, any other hardware platform, or any combination or multiplicity thereof. The computing machine 2000 may be a distributed system configured to function using multiple computing machines interconnected via a data network or bus system.

The processor 2010 may be configured to execute code or instructions to perform the operations and functionality described herein, manage request flow and address mappings, and to perform calculations and generate commands. The processor 2010 may be configured to monitor and control the operation of the components in the computing machine 2000. The processor 2010 may be a general purpose processor, a processor core, a multiprocessor, a reconfigurable processor, a microcontroller, a digital signal processor ("DSP"), an application specific integrated circuit ("ASIC"), a graphics processing unit ("GPU"), a field programmable gate array ("FPGA"), a programmable logic device ("PLD"), a controller, a state machine, gated logic, discrete hardware components, any other processing unit, or any combination or multiplicity thereof. The processor 2010 may be a single processing unit, multiple processing units, a single processing core, multiple processing cores, special purpose processing cores, co-processors, or any combination thereof. According to certain examples, the processor 2010 along with other components of the computing machine 2000 may be a virtualized computing machine executing within one or more other computing machines.

The system memory 2030 may include non-volatile memories such as read-only memory ("ROM"), programmable read-only memory ("PROM"), erasable programmable read-only memory ("EPROM"), flash memory, or any other device capable of storing program instructions or data with or without applied power. The system memory 2030 may also include volatile memories such as random access memory ("RAM"), static random access memory ("SRAM"), dynamic random access memory ("DRAM"), and synchronous dynamic random access memory ("SDRAM"). Other types of RAM also may be used to implement the system memory 2030. The system memory 2030 may be implemented using a single memory module or multiple memory modules. While the system memory 2030 is depicted as being part of the computing machine 2000, one skilled in the art will recognize that the system memory 2030 may be separate from the computing machine 2000 without departing from the scope of the subject technology. It should also be appreciated that the system memory 2030 may include, or operate in conjunction with, a non-volatile storage device such as the storage media 2040.

The storage media 2040 may include a hard disk, a floppy disk, a compact disc read only memory ("CD-ROM"), a digital versatile disc ("DVD"), a Blu-ray disc, a magnetic tape, a flash memory, other non-volatile memory device, a solid state drive ("SSD"), any magnetic storage device, any optical storage device, any electrical storage device, any semiconductor storage device, any physical-based storage device, any other data storage device, or any combination or multiplicity thereof. The storage media 2040 may store one or more operating systems, application programs and program modules such as module 2050, data, or any other information. The storage media 2040 may be part of, or connected to, the computing machine 2000. The storage media 2040 may also be part of one or more other computing machines that are in communication with the computing machine 2000 such as servers, database servers, cloud storage, network attached storage, and so forth.

The module 2050 may comprise one or more hardware or software elements configured to facilitate the computing machine 2000 with performing the various methods and processing functions presented herein. The module 2050 may include one or more sequences of instructions stored as software or firmware in association with the system memory 2030, the storage media 2040, or both. The storage media 2040 may therefore represent examples of machine or computer readable media on which instructions or code may be stored for execution by the processor 2010. Machine or computer readable media may generally refer to any medium or media used to provide instructions to the processor 2010. Such machine or computer readable media associated with the module 2050 may comprise a computer software product. It should be appreciated that a computer software product comprising the module 2050 may also be associated with one or more processes or methods for delivering the module 2050 to the computing machine 2000 via the network 2080, any signal-bearing medium, or any other communication or delivery technology. The module 2050 may also comprise hardware circuits or information for configuring hardware circuits such as microcode or configuration information for an FPGA or other PLD.

The input/output ("I/O") interface 2060 may be configured to couple to one or more external devices, to receive data from the one or more external devices, and to send data to the one or more external devices. Such external devices along with the various internal devices may also be known as peripheral devices. The I/O interface 2060 may include both electrical and physical connections for operably coupling the various peripheral devices to the computing machine 2000 or the processor 2010. The I/O interface 2060 may be configured to communicate data, addresses, and control signals between the peripheral devices, the computing machine 2000, or the processor 2010. The I/O interface 2060 may be configured to implement any standard interface, such as small computer system interface ("SCSI"), serial-attached SCSI ("SAS"), fiber channel, peripheral component interconnect ("PCI"), PCI express (PCIe), serial bus, parallel bus, advanced technology attached ("ATA"), serial ATA ("SATA"), universal serial bus ("USB"), Thunderbolt, FireWire, various video buses, and the like. The I/O interface 2060 may be configured to implement only one interface or bus technology. Alternatively, the I/O interface 2060 may be configured to implement multiple interfaces or bus technologies. The I/O interface 2060 may be configured as part of, all of, or to operate in conjunction with, the system bus 2020. The I/O interface 2060 may include one or more buffers for buffering transmissions between one or more external devices, internal devices, the computing machine 2000, or the processor 2010.

The I/O interface 2060 may couple the computing machine 2000 to various input devices including mice, touch-screens, scanners, electronic digitizers, sensors, receivers, touchpads, trackballs, cameras, microphones, keyboards, any other pointing devices, or any combinations thereof. The I/O interface 2060 may couple the computing machine 2000 to various output devices including video displays, speakers, printers, projectors, tactile feedback devices, automation control, robotic components, actuators, motors, fans, solenoids, valves, pumps, transmitters, signal emitters, lights, and so forth.

The computing machine 2000 may operate in a networked environment using logical connections through the network interface 2070 to one or more other systems or computing machines across the network 2080. The network 2080 may include wide area networks (WAN), local area networks (LAN), intranets, the Internet, wireless access networks, wired networks, mobile networks, telephone networks, optical networks, or combinations thereof. The network 2080 may be packet switched, circuit switched, of any topology, and may use any communication protocol. Communication links within the network 2080 may involve various digital or an analog communication media such as fiber optic cables, free-space optics, waveguides, electrical conductors, wireless links, antennas, radio-frequency communications, and so forth.

The processor 2010 may be connected to the other elements of the computing machine 2000 or the various peripherals discussed herein through the system bus 2020. It should be appreciated that the system bus 2020 may be within the processor 2010, outside the processor 2010, or both. According to certain examples, any of the processor 2010, the other elements of the computing machine 2000, or the various peripherals discussed herein may be integrated into a single device such as a system on chip ("SOC"), system on package ("SOP"), or ASIC device.

The present technology may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing the present technology in computer programming, and the examples should not be construed as limited to any one set of computer program instructions. Further, a skilled programmer would be able to write such a computer program to implement the present technology as described herein based on the appended flow charts and associated description in the application text. Therefore, disclosure of a particular set of program code instructions is not considered necessary for an adequate understanding of how to make and use the technology described herein. Further, those skilled in the art will appreciate that one or more aspects of the technology described herein may be performed by hardware, software, or a combination thereof, as may be embodied in one or more computing systems. Moreover, any reference to an act being performed by a computer should not be construed as being performed by a single computer as more than one computer may perform the act.

The technology described herein can be used with computer hardware and software that perform the methods and processing functions described herein. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

The example systems, methods, and acts described in the examples presented previously are illustrative, and, in alternative examples, certain acts can be performed in a different order, in parallel with one another, omitted entirely, and/or combined between different examples, and/or certain additional acts can be performed, without departing from the scope and spirit of various examples. Accordingly, such alternative examples are included in the scope of the following claims, which are to be accorded the broadest interpretation to encompass such alternate examples. For example, an input such as Although specific examples have been described above in detail, the description is merely for purposes of illustration. It should be appreciated, therefore, that many aspects described above are not intended as required or essential elements unless explicitly stated otherwise. Modifications of, and equivalent components or acts corresponding to, the disclosed aspects of the examples, in addition to those described above, can be made by a person of ordinary skill in the art, having the benefit of the present disclosure, without departing from the spirit and scope of technology described herein defined in the following claims, the scope of which is to be accorded the broadest interpretation so as to encompass such modifications and equivalent structures.

What is claimed is:

1. A computer-implemented method to distribute warehousing of products, comprising:

training, by one or more computing devices of a distributed warehousing system, a machine-learning model for determining a likelihood that an order for delivery of a product will be placed within a predetermined time period by another customer within a delivery area of an original customer that ordered the product, the predetermined time period extending from designation of the product for return by the original customer, by:

inputting first training data into the machine-learning model during a first training time, the first training data being associated with previous purchases made during a first time window; and updating the machine-learning model by inputting second training data subsequent to the first training time, the second training data being associated with previous purchases made subsequent to the first training time, wherein the first and second training data each includes a plurality of ordered products, a region associated with each of the plurality of ordered products, and a time until each of the plurality of ordered products was ordered by a next customer within the associated region, each of the plurality of ordered products having product characteristics, each associated region having region characteristics;

receiving, by the one or more computing devices, a first notification that a first product was delivered to a first customer at a first location;

receiving, by the one or more computing devices, a designation of the first product for return;

determining, by the one or more computing devices, that the first customer is eligible to be a source of the first product based on a rating of the first customer as a previous source of previously returned products;

determining, by the one or more computing devices, whether a pending order exists for the first product by another customer after receiving the designation of the product for return;

in response to determining that no pending order exists for the product by another customer, querying, by the one or more computing devices, the machine-learning model for a first likelihood that an order will be placed by another customer, within a first predetermined time period from the designation of the first product for return, for delivery of the first product within a first delivery area of the first customer by inputting a product identifier of the first product, region characteristics of the first delivery area, and the first predetermined time period into the machine-learning model;

directing, by the one or more computing devices, intermediate storage of the first product at the first location in response to the first likelihood being over a threshold;

identifying, by the one or more computing devices, a second customer as placing, subsequent to directing the intermediate storage of the first product and within the first predetermined time period, the order for the first product and for delivery at a second location that is within the first delivery area of the first customer;

receiving, by the one or more computing devices, a second notification of pickup of the first product from the first location; and directing, by the one or more computing devices, delivery of the first product to the second location, without an intermediate storage of the first product at a brick-and-mortar distribution facility, in response to receiving the second notification.

2. The method of claim 1, wherein determining that the first customer is eligible to be the source of the first product is further based on a difficulty of repackaging the first product.

3. The method of claim 1, wherein the first and second training data used to train the machine-learning model each describe past purchases of customers within a region of the first customer.

4. The method of claim 1, wherein the first and second training data used to train the machine-learning model each describe past purchases of customers outside of a region of the first customer.

5. The method of claim 1, further comprising: receiving, by the one or more computing devices, a third notification that the first product was delivered to the second location.

6. A computer program product, comprising:

a non-transitory computer-readable storage device having computer-executable program instructions embodied thereon that when executed by a computer of a distributed warehousing system cause the computer to distribute warehousing of products, the computer-executable program instructions comprising:

computer-executable program instructions to train a machine-learning model for determining a likelihood that an order for delivery of a product will be placed within a predetermined time period by another customer within a delivery area of an original customer that ordered the product, the predetermined time period extending from designation of the product for return by the original customer, by:

inputting first training data into the machine-learning model during a first training time, the first training data being associated with previous purchases made during a first time window; and updating the machine-learning model by inputting second training data subsequent to the first training time, the second training data being associated with previous purchases made subsequent to the first training time, wherein the first and second training data each includes a plurality of ordered products, a region associated with each of the plurality of ordered products, and a time until each of the plurality of ordered products was ordered by a next customer within the associated region, each of the plurality of ordered products having product characteristics, each associated region having region characteristics;

computer-executable program instructions to receive a first notification that a first product was delivered to a first customer at a first location;

computer-executable program instructions to receive a designation of the first product for return;

computer-executable program instructions to determine that the first customer is eligible to be a source of the first product based on a rating of the first customer as a previous source of previously returned products;

computer-executable program instructions to determine whether a pending order exists for the first product by another customer after receiving the designation of the first product for return;

computer-executable program instructions to query the machine-learning model for a first likelihood that an order will be placed by another customer, within a first predetermined time period from the designation of the first product for return, for the first product for delivery within a first delivery area of the first customer when no pending order exists for the first product by another customer by inputting a product identifier of the first product, region characteristics of the first delivery area, and the first predetermined time period into the machine-learning model;

computer-executable program instructions to direct intermediate storage of the first product at the first location in response to the first likelihood being over a threshold;

computer-executable program instructions to identify a second customer as placing the order for the first product, subsequent to directing the intermediate storage of the first product and within the first predetermined time period, for delivery at a second location that is within the first delivery area of the first customer;

computer-executable program instructions to receive a second notification of pickup of the first product from the first location; and computer-executable program instructions to direct delivery of the first product to the second location, without an intermediate storage of the first product at a brick-and-mortar distribution facility, in response to receiving the second notification.

7. The computer program product of claim 6, wherein the computer-executable program instructions further comprise computer-executable program instructions to determine that the first product is eligible for delivery to the second customer and that the first customer is eligible to be the source of the first product.

8. The computer program product of claim 7 wherein determining that the first customer is eligible to be the source of the first product is further based on a difficulty of repackaging the first product.

9. The computer program product of claim 6, wherein the first and second training data used to train the machine-learning model each describe past purchases of customers within a region of the first customer.

10. The computer program product of claim 6, wherein the first and second training data used to train the machine-learning model each describe past purchases of customers outside of a region of the first customer.

11. The computer program product of claim 6, further comprising computer-executable program instructions to receive a third notification that the first product was delivered to the second location.

12. A system to distribute warehousing of products, comprising:
a storage device; and
a processor communicatively coupled to the storage device, wherein the processor executes application code instructions that are stored in the storage device to cause the system to:
train a machine-learning model for determining a likelihood that an order for delivery of a product will be placed within a predetermined time period by another customer within a delivery area of an original customer that ordered the product, the predetermined time period extending from designation of the product for return by the original customer, by:
inputting first training data into the machine-learning model during a first training time, the first training data being associated with previous purchases made during a first time window; and
updating the machine-learned model by inputting second training data subsequent to the first training time, the second training data being associated with previous purchases made subsequent to the first training time,
wherein the first and second training data each includes a plurality of ordered products, a region associated with each of the plurality of ordered products, and a time until each of the plurality of ordered products was ordered by a next customer within the associated region, each of the plurality of ordered products having product characteristics, each associated region having region characteristics;
receive a first notification that a first product was delivered to a first customer at a first location;
receive a designation of the first product for return;
determine that the first customer is eligible to be a source of the first product based on a rating of the first customer as a previous source of previously returned products;
determine whether a pending order exists for the first product by another customer after receiving the designation of the product for return;
query the machine-learning model for a first likelihood that an order will be placed by another customer, within a first predetermined time period from the designation of the first product for return, for delivery of the first product within a first delivery area of the first customer by inputting, into the machine-learned model, a product identifier of the first product, region characteristics, of the first location, and the first predetermined time period when no pending order exists for the first product by another customer;
direct intermediate storage of the first product at the first location in response to the first likelihood being over a threshold;
identify a second customer as placing, subsequent to directing intermediate storage of the first product and within the first predetermined time period, the order for the first product at second location that is within the first delivery area of the first customer;
receive a second notification of pickup of the first product from the first location; and
direct delivery of the first product to the second location, without an intermediate storage of the first product at a brick-and-mortar distribution facility, in response to receiving the second notification.

13. The system of claim 12, wherein determining that the first customer is eligible to be the source of the first, product is further based on a difficulty of repackaging the first product.

14. The system of claim 12, wherein directing delivery of the first product to the second location, without the intermediate storage of the first product at the brick-and-mortar distribution facility, in response to receiving the second notification comprises changing a meaning of a code associated with the first product.

15. The system of claim 12, wherein directing delivery of the first product to the second location, without the intermediate storage of the first product at the brick-and-mortar distribution facility, in response to receiving the second notification comprises changing a meaning of a code displayed by a label affixed to a packaging of the first product.

16. The system of claim 12, wherein the first and second training data used to train the machine-learning model each describe past purchases of customers within a region of the first customer.

17. The system of claim 12, wherein the first and second training data used to train the machine-learning model each describe past purchases of customers outside of a region of the first customer.

18. The system of claim 12, wherein the system is further configured to receive a third notification that the first product was delivered to the second location.

\* \* \* \* \*